United States Patent
Shimizu et al.

(10) Patent No.: US 9,161,042 B2
(45) Date of Patent: Oct. 13, 2015

(54) QUANTIZATION CONTROL METHOD AND APPARATUS, PROGRAM THEREFOR, AND STORAGE MEDIUM WHICH STORES THE PROGRAM

(75) Inventors: Atsushi Shimizu, Yokosuka (JP); Ryuichi Tanida, Yokosuka (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 752 days.

(21) Appl. No.: 12/528,879

(22) PCT Filed: Mar. 5, 2008

(86) PCT No.: PCT/JP2008/053948
§ 371 (c)(1),
(2), (4) Date: Aug. 27, 2009

(87) PCT Pub. No.: WO2008/111454
PCT Pub. Date: Sep. 18, 2008

(65) Prior Publication Data
US 2010/0014583 A1    Jan. 21, 2010

(30) Foreign Application Priority Data
Mar. 14, 2007 (JP) .................................. 2007-064274

(51) Int. Cl.
*H04N 7/12* (2006.01)
*H04N 19/124* (2014.01)
(Continued)

(52) U.S. Cl.
CPC ........... *H04N 19/124* (2014.11); *H04N 19/136* (2014.11); *H04N 19/142* (2014.11);
(Continued)

(58) Field of Classification Search
CPC .......... H04N 7/26079; H04N 7/26122; H04N 7/26143; H04N 19/177; H04N 19/174; H04N 19/179; H04N 19/176; H04N 19/152

USPC ......... 375/240.03, 240.05, 240; 382/232, 239
See application file for complete search history.

(56) References Cited

U.S. PATENT DOCUMENTS 5,086,488 A * 2/1992 Kato et al. .................. 382/239
5,283,646 A   2/1994 Bruder
(Continued)

FOREIGN PATENT DOCUMENTS

CN    1713733 A      12/2005
EP    0 424 060 A2   4/1991
(Continued)

OTHER PUBLICATIONS

MPEG-2, Test Model 5(TM5), Doc.ISO/IECJTC1/SC29/WG11/N0400, Test Model Editing Committee, pp. 59-63, Apr. 1993.
(Continued)

*Primary Examiner* — Y Lee
*Assistant Examiner* — Richard Carter
(74) *Attorney, Agent, or Firm* — Harness, Dickey & Pierce, P.L.C.

(57) ABSTRACT

A quantization control method used in a video encoding which encodes a video image and performs control for making an encoding bit rate approach a predetermined target bit rate. The quantization control method includes measuring a differential amount of code between a target amount of code and an amount of generated code; determining whether or not a predetermined condition has occurred; determining, when it is determined that the condition has occurred, a variation for an amount of feedback which increases or decreases a quantization step size, and changing the amount of feedback based on the determined variation; and increasing or decreasing the quantization step size based on the measured differential amount of code and the changed amount of feedback. If there are a plurality of the predetermined conditions, a final variation for the amount of feedback may be determined by applying a specific operation to variations for the amount of feedback, which are determined for the individual conditions.

16 Claims, 7 Drawing Sheets

(51) Int. Cl.

| | |
|---|---|
| H04N 19/176 | (2014.01) |
| H04N 19/172 | (2014.01) |
| H04N 19/61 | (2014.01) |
| H04N 19/136 | (2014.01) |
| H04N 19/142 | (2014.01) |
| H04N 19/152 | (2014.01) |
| H04N 19/177 | (2014.01) |
| H04N 19/174 | (2014.01) |
| H04N 19/179 | (2014.01) |

(52) U.S. Cl.
CPC ........... *H04N19/152* (2014.11); *H04N 19/172* (2014.11); *H04N 19/174* (2014.11); *H04N 19/176* (2014.11); *H04N 19/177* (2014.11); *H04N 19/179* (2014.11); *H04N 19/61* (2014.11)

(56) References Cited

U.S. PATENT DOCUMENTS

| | | | |
|---|---|---|---|
| 5,398,068 | A | 3/1995 | Liu et al. |
| 5,398,078 | A | 3/1995 | Masuda et al. |
| 5,760,836 | A | 6/1998 | Greenfield et al. |
| 5,781,237 | A | 7/1998 | Fukuda |
| 5,832,128 | A | 11/1998 | Suzuki |
| 5,835,145 | A | 11/1998 | Ouyang et al. |
| 6,115,421 | A * | 9/2000 | Katta et al. ............ 375/240 |
| 6,148,029 | A | 11/2000 | Fert |
| 6,173,012 | B1 | 1/2001 | Katta et al. |
| 6,414,995 | B2 | 7/2002 | Okumura et al. |
| 6,480,544 | B1 | 11/2002 | Uehara et al. |
| 6,498,810 | B1 | 12/2002 | Kim et al. |
| 6,546,050 | B2 | 4/2003 | Ramaswamy |
| 6,567,554 | B1 * | 5/2003 | Sugahara et al. ............ 382/232 |
| 6,798,837 | B1 | 9/2004 | Uenoyama et al. |
| 6,859,496 | B1 | 2/2005 | Boroczky et al. |
| 6,963,608 | B1 | 11/2005 | Wu |
| 7,042,943 | B2 | 5/2006 | Haskell et al. |
| 7,197,072 | B1 | 3/2007 | Hsu et al. |
| 7,953,154 | B2 | 5/2011 | Murakami et al. |
| 8,634,458 | B2 * | 1/2014 | Ishii ............ 375/240.03 |
| 2002/0122482 | A1 | 9/2002 | Kim et al. |
| 2003/0043917 | A1 | 3/2003 | Bublil et al. |
| 2003/0095594 | A1 | 5/2003 | Laksono et al. |
| 2003/0112872 | A1 | 6/2003 | Park et al. |
| 2004/0120404 | A1 | 6/2004 | Sugahara et al. |
| 2004/0126028 | A1 | 7/2004 | Adachi et al. |
| 2004/0197024 | A1 | 10/2004 | Bobichon et al. |
| 2005/0036698 | A1 | 2/2005 | Beom |
| 2005/0063468 | A1 | 3/2005 | Shimizu et al. |
| 2005/0066318 | A1 | 3/2005 | Chujoh et al. |
| 2005/0078748 | A1 | 4/2005 | Moni et al. |
| 2005/0152450 | A1 * | 7/2005 | Ueno et al. ............ 375/240.03 |
| 2005/0159946 | A1 | 7/2005 | Chen et al. |
| 2005/0175093 | A1 * | 8/2005 | Haskell et al. ............ 375/240.03 |
| 2005/0207493 | A1 | 9/2005 | Kobayakawa |
| 2005/0243930 | A1 | 11/2005 | Asano et al. |
| 2006/0072666 | A1 | 4/2006 | Cho et al. |
| 2006/0126732 | A1 | 6/2006 | Pian et al. |
| 2006/0153293 | A1 | 7/2006 | Hsu et al. |
| 2006/0159357 | A1 | 7/2006 | Mizuno |
| 2006/0171457 | A1 | 8/2006 | DeGarrido et al. |
| 2006/0176953 | A1 | 8/2006 | Mohsenian |
| 2006/0209965 | A1 | 9/2006 | Tseng |
| 2006/0222074 | A1 | 10/2006 | Zhang |
| 2006/0251172 | A1 | 11/2006 | Kim |
| 2007/0009045 | A1 | 1/2007 | Mohandas |
| 2007/0071094 | A1 | 3/2007 | Takeda et al. |
| 2007/0296613 | A1 | 12/2007 | Hussain et al. |
| 2009/0168884 | A1 | 7/2009 | Lu et al. |
| 2010/0014583 | A1 * | 1/2010 | Shimizu et al. ............ 375/240.05 |

FOREIGN PATENT DOCUMENTS

| | | |
|---|---|---|
| EP | 0 757 490 A2 | 2/1997 |
| EP | 0 773 688 A2 | 5/1997 |
| EP | 1032213 A2 | 8/2000 |
| EP | 1120976 A1 | 8/2001 |
| EP | 1182888 A2 | 2/2002 |
| EP | 1 274 253 A2 | 1/2003 |
| EP | 1662801 A1 | 5/2006 |
| JP | 04-150284 A | 5/1992 |
| JP | 04-298184 A | 10/1992 |
| JP | 05-328333 A | 12/1993 |
| JP | 6-113271 A | 4/1994 |
| JP | 6-237448 A | 8/1994 |
| JP | 7-203430 A | 8/1995 |
| JP | 7-0264579 | 10/1995 |
| JP | 08-009379 A | 1/1996 |
| JP | 08-9379 A | 1/1996 |
| JP | 08-009397 A | 1/1996 |
| JP | 8-116448 A | 5/1996 |
| JP | 9-098427 A | 4/1997 |
| JP | 10-126792 A | 5/1998 |
| JP | 10-290461 A | 10/1998 |
| JP | 11-55671 A | 2/1999 |
| JP | 11-196424 A | 7/1999 |
| JP | 11-239354 | 8/1999 |
| JP | 11-252572 A | 9/1999 |
| JP | 2000-023162 A | 1/2000 |
| JP | 2000-138938 A | 5/2000 |
| JP | 2000-201328 A | 7/2000 |
| JP | 2000-244921 A | 9/2000 |
| JP | 2000-261799 A | 9/2000 |
| JP | 2002-010260 A | 1/2002 |
| JP | 2002-247587 A | 8/2002 |
| JP | 2004-64725 A | 2/2004 |
| JP | 2004-134896 A | 4/2004 |
| JP | 2004-166088 A | 6/2004 |
| JP | 2005-45736 A | 2/2005 |
| JP | 2005-073245 A | 3/2005 |
| JP | 2005-102170 A | 4/2005 |
| JP | 2005-295526 A | 10/2005 |
| JP | 2005-318296 A | 11/2005 |
| JP | 2005-318468 A | 11/2005 |
| JP | 2006-005466 A | 1/2006 |
| JP | 2006-506032 A | 2/2006 |
| JP | 2006-203437 A | 8/2006 |
| JP | 2006-270683 | 10/2006 |
| JP | 2006-295535 A | 10/2006 |
| RU | 2 123 769 C1 | 12/1998 |
| RU | 2 127 962 C1 | 3/1999 |
| RU | 2 137 194 C1 | 9/1999 |
| RU | 2 210 817 C2 | 8/2003 |
| RU | 2 277 761 C2 | 7/2004 |
| RU | 2004 125 588 A | 1/2006 |
| SU | 1649674 A1 | 5/1991 |
| TW | I256259 B | 6/2006 |
| TW | 200629911 A | 8/2006 |
| TW | 200704203 A | 1/2007 |
| WO | WO-01/10135 A1 | 2/2001 |
| WO | 03/084242 A2 | 10/2003 |
| WO | WO-2006/006564 A1 | 1/2006 |
| WO | 2006/096869 A2 | 9/2006 |

OTHER PUBLICATIONS

Adachi, S., et al., CAVLC Cleanup to Accommodate ABT including Field Scans Joint Video Team (JVT) of ISO/IEC MPEG & ITU-T VCEG (ISO/IEC JTC1/SC29/WG11 and ITU-T SG16 Q.6), 5th Meeting, Geneva, Switzerland, Oct. 9-17, 2002, pp. 1-4, XP002339408.

http://iphome.hhi.de/suehring/tml/download/ on the Internet.

ISO/IEC-13818-2, "Information technology—Generic coding of moving pictures and associated audio information: Video", pp. 77-85, May, 1996.

ITU-T H.264 ITU-T Rec. H.264, "Advanced video coding for generic audiovisual services", pp. 146-149, Mar. 2005.

Sakae Okubo, Shinya Kadono, Yoshihiro Kikichi, and Teruhiko Suzuki, "H.264/AVC TEXTBOOK", Impress, pp. 144-146, 2004.

(56) References Cited

OTHER PUBLICATIONS

CABAC: Detlev Marpe, Heiko Schwarz, Thomas Wiegand, "Context-Based Adaptive Binary Arithmetic Coding in the H.264/AVC Video Compression Standard", IEEE Transactions on Circuits and Systems for Video Technology, vol. 13, No. 7, pp. 620-636, Jul. 2003.
Edited by The Institute of Television Engineers of Japan, Sogo Multimedia Sensho MPEG, 1$^{st}$ edition, Ohmsha, Ltd., Apr. 20, 1996, pp. 110 to 113, 5-5 Rate Seigyo to Buffer Seigyo 1 Bit Haibun, Rate Seigyo to Tekioryosika (1) Step 1.
Fujita, Gen, et al., "Real-time Processing Method for H.264 CABAC Using low Clock Frequency," IEICE Technical Report, The Institute of Electronics, Information and Communication Engineers, vol. 106, No. 116, Jun. 16, 2006, pp. 19-23.
Sullivan, Gary J., et al., "Rate-Distortion Optimization for Video Compression," IEEE Signal Processing Magazine, Nov. 1998, pp. 74-90, vol. 15, No. 6.
Vetro, Anthony, et al., "MPEG-4 Rate Control for Multiple Video Objects," IEEE Transactions on Circuits and Systems for Video Technology, Feb. 1999, pp. 186-199, vol. 9, No. 1.
Yin, Ming, et al., "A Rate Control Scheme for H.264 Video Under Low Bandwidth Channel," Journal of Zhejiang University Science A, Jun. 2006, pp. 990-995, vol. 7, No. 6.
Lu, Xiaoan, et al., "Fast Mode Decision and Motion Estimation for H.264 with a Focus on MPEG-21H.264 Transcoding," Conference Proceedings, IEEE International Symposium on Circuits and Systems (ISCAS), May 23, 2005, pp. 1246-1249.
Wiegand, Thomas, et al., "Overview of the H.264/AVC Video Coding Standard," IEEE Transactions on Circuits and Systems for Video Technology, vol. 13, No. 7, Jul. 2003, pp. 560-576.
Richardson, Iain, "H.264 and MPEG-4 Video Compression: Video Coding for Next Generation," Moscow: Tekhnosfera, 2005, pp. 55-65, 228-240 (pp. 33-42, 172-184 of translation).
Yi, Xiaoquan, et al., "Improved and simplified fast motion estimation for JM," Joint Video Team (JVT) of ISO/IEC MPEG & ITU-T VCEG, JVT-P021, 16th Meeting: Poznan, Poland, Jul. 24-29, 2005, pp. 1-23.
Richardson, Iain, "H.264 and MPEG-4 Video Compression: Video Coding for Next Generation," Moscow: Tekhnosfera, 2005, pp. 261-269 (pp. 201-207 of translation).
Chang, Chih-Feng, et al., "A Stable Buffer Control Strategy for MPEG Coding," IEEE Transactions on Circuits and Systems for Video Technology, vol. 7, No. 6, pp. 920-924, Dec. 1997.
Notification to Grant Patent Right for Invention, Chinese Patent Application No. 200880007031.2, Dec. 4, 2014.

* cited by examiner

QUANTIZATION CONTROL METHOD AND APPARATUS, PROGRAM THEREFOR, AND STORAGE MEDIUM WHICH STORES THE PROGRAM

TECHNICAL FIELD

The present invention relates to a quantization control method for controlling an encoding bit rate of video encoding and a corresponding apparatus, a quantization control program for implementing the quantization control method, and a computer-readable storage medium which stores the program.

Priority is claimed on Japanese Patent Application No. 2007-064274, filed Mar. 14, 2007, the contents of which are incorporated herein by reference.

BACKGROUND ART

In many video encoding methods, the amount of generated code varies depending on the character of an input image. Therefore, an encoding bit rate control technique is required for controlling the amount of generated code and keeping a constant encoding bit rate.

The amount of generated code closely relates to the quantization step size, and the amount of generated code is controlled by varying the quantization step size.

In test model 5 (abbreviated as "TM5") of MPEG-2, code amount control is performed using a relationship between the quantization step size and the amount of generated code (see, for example, Non-Patent Document 1).

Below, the code amount control in TM5 of MPEG-2 will be explained.

In TM5 of MPEG-2, code amount control is performed using a unit called GOP (group of pictures), which may include I, P, and B pictures having different picture types such as I, P, and B picture types.

Figure 6:
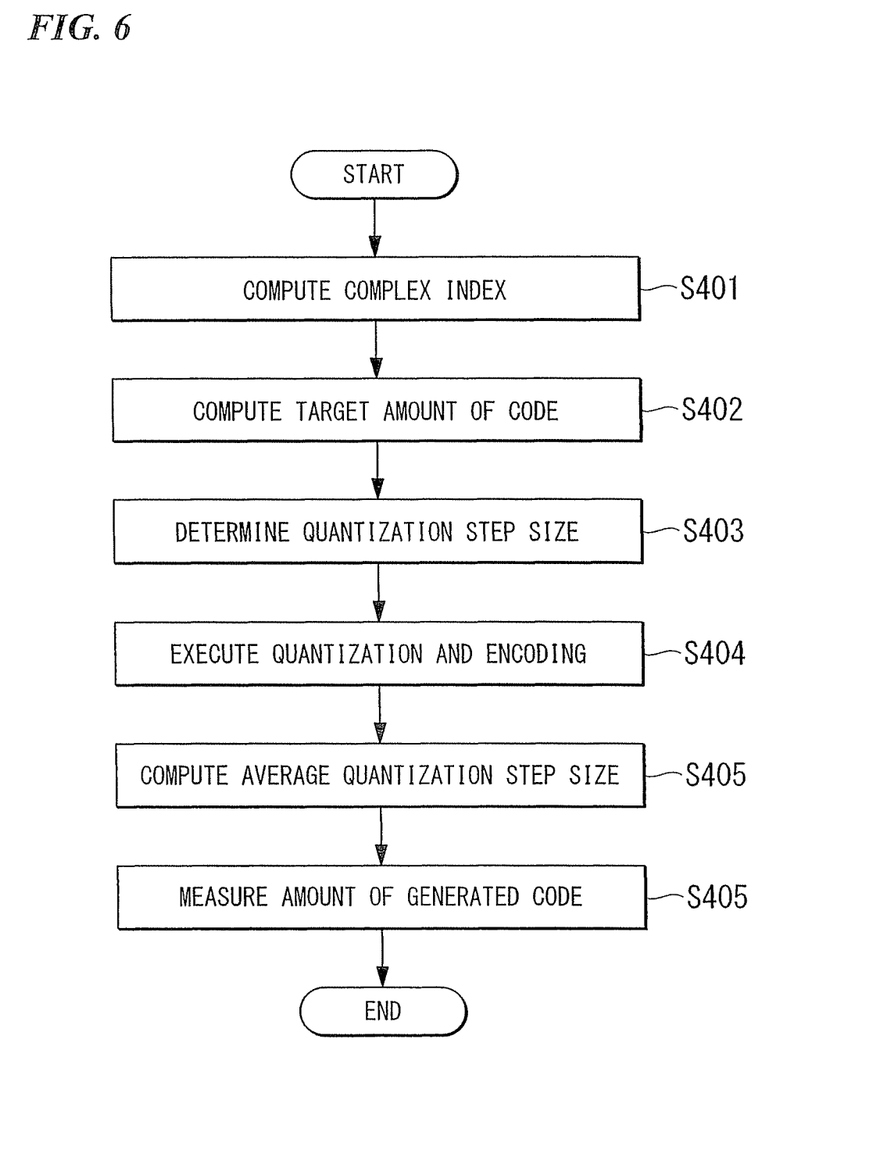
FIG. 6 is a flowchart of the code amount control in TM5 of MPEG-2.

FIG. 6 shows a flowchart of the code amount control in TM5 of MPEG-2.

As shown in the flowchart, in the code amount control of TM5 in MPEG-2, in the first step S401, a complex index $X_x$ for each picture type (x=i, p, b (which respectively correspond to I, P, and B pictures)) is computed by the following formula:

$$X_x = S_x \cdot \langle Q_x \rangle$$

In the above formula, x indicates the picture type, $S_x$ indicates the amount of code generated for an image which has the same picture type as the present image and was encoded most recently, and $\langle Q_x \rangle$ indicates an average of the quantization step size in the relevant encoding.

Generally, the code amount $S_x$ is in inverse proportion to the quantization step size $Q_x$. Therefore, computation of the complex index $X_x$ gives a relationship between the amount of generated code and the quantization step size.

In the next step S402, a target amount $T_x$ of code (x=i, p, b) for each picture type is computed by the following formulas.

[Formula 1]

$$T_i = \frac{R}{1 + \frac{N_p X_p}{X_i K_p} + \frac{N_b X_b}{X_i K_b}}$$ Formula (1)

$$T_p = \frac{R}{N_p + \frac{N_b K_p X_b}{X_p K_p}}$$

$$T_b = \frac{R}{N_b + \frac{N_p K_b X_p}{X_b K_p}}$$

Here, R indicates the amount of code allocated to the relevant GOP, $N_p$ indicates the number of P pictures in the GOP, $N_b$ indicates the number of B pictures in the GOP, and $K_p$ and $K_b$ are constants.

The above formulas show that in order to set the target code amount $T_i$, P pictures are converted to I pictures in accordance with $X_p/X_i$, B pictures are converted to I pictures in accordance with $X_b/X_i$, and the target code amount $T_i$ is computed based on the converted values, the numbers $N_p$ and $N_b$ of pictures, and the amount R of code allocated to the GOP.

In order to set the target code amount $T_p$, B pictures are converted to P pictures in accordance with $X_b/X_p$, and the target code amount $T_p$ is computed based on the converted value, the numbers $N_p$ and $N_b$ of pictures, and the amount R of code allocated to the GOP.

In order to set the target code amount $T_b$, P pictures are converted to B pictures in accordance with $X_p/X_b$, and the target code amount $T_b$ is computed based on the converted value, the numbers $N_p$ and $N_b$ of pictures, and the amount R of code allocated to the GOP.

In the next step S403, based on the target code amount $T_x$ set above for the pictures, the quantization step size for a small block as an encoding target is determined.

The quantization step size is computed based on an amount $d_x(j)$ of occupation of a virtual buffer and a reaction parameter r, by using the following formula.

[Formula 2]

$$Q_x(j) = \frac{d_x(j) \cdot 31}{r}$$ Formula (2)

A virtual buffer used only for computing the quantization step size is set for each picture type, and the amount $d_x(j)$ of occupation thereof is updated by the following formula.

[Formula 3]

$$d_x(j) = d_x(0) + G_x(j-1) - \frac{T_x \cdot (j-1)}{MB_{cnt}}$$ Formula (3)

In the above formula, $G_x(j)$ indicates the total amount of code generated until the j-th small block in the encoding target picture is encoded, and $MB_{cnt}$ indicates the number of small blocks in the relevant picture. The reaction parameter is computed by following formula.

[Formula 4]

$$r = \frac{2 * \text{Bitrate}}{\text{Picture\_rate}}$$ Formula (4)

In step S403 using the above-described method, the quantization step size $Q_x(j)$ assigned to a small block as the encoding target is determined based on the amount $d_x(j)$ of occupation of the virtual buffer and the reaction parameter r.

In the next step S404, each small block is subjected to quantization and encoding by using the determined quantization step size $Q_x(j)$.

In the next step S405, after encoding of one picture is completed, average $\langle Q_x \rangle$ of the quantization step size is computed.

In the next step S406, (after encoding of one picture is completed,) the actual amount $S_x$ of generated code is measured.

Based on the measured amount $S_x$ of generated code and the computed average quantization step size $<Q_x>$, in step S401 again, the complex index $X_x$ for each picture type is updated.

In accordance with the above method, in TM5 of MPEG-2, a target amount of code is assigned to each picture when encoding the picture, thereby controlling the amount of generated code.

The above control method provides a stable operation if characteristics of the relevant video do not considerably change, and there is no overflow or underflow of a decoder buffer.

However, actual control must consider a scene change or the state of the decoder buffer.

For example, if a very simple scene continues in a static image such as telop, the quantization step size decreases very much. If an image (of a landscape, etc.) having a fine texture then appears, the image having a fine texture is encoded using a very small quantization step size, which causes an explosive increase in the amount of generated code and thus failure in the bit-rate control.

Accordingly, in a known proposed method, after detecting a scene change, the quantization step size is changed to a predetermined value (see, for example, Patent Document 1).

In this method, when a scene change has been detected, an initial value (of the quantization step size) defined for scene change is compared with a quantization step size computed through a rate control, and the larger quantization step size is used for the quantization.

In accordance with the above method, when a scene change has been detected, the quantization step size can be controlled, thereby preventing an explosive increase in the amount of generated code.

Non-Patent Document 1: MPEG-2, Test Model5(TM5), Doc.ISO/IECJTC1/SC29/WG111/NO400, Test Model Editing Committee, pp. 59-63, Apr., 1993.

Patent Document 1: Japanese Unexamined Patent Application, First Publication No. H06-113271.

DISCLOSURE OF INVENTION

Problem to be Solved by the Invention

As described above, in a conventional technique, an abrupt change in an input video image due to a cause other than quantization control is avoided by initializing the state of quantization control.

However, in accordance with such a conventional technique, quantization is not performed using a quantization step size in consideration of a character of the encoding target picture immediately after a variation in the relevant conditions. Therefore, a long time is required for settling a variation in the quantization step size or a corresponding variation in the amount of generated code.

Figure 7:
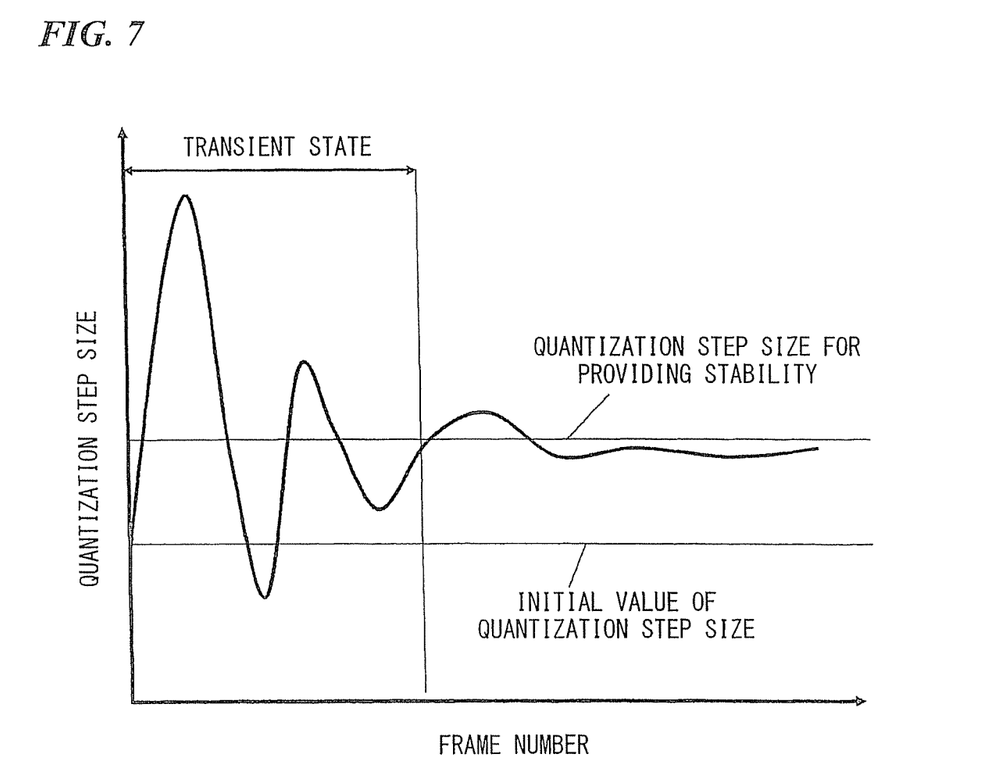
FIG. 7 is a diagram explaining an problem of conventional techniques.

FIG. 7 shows an example explaining the above. This example shows a state in which an initial value (set by initialization) of the quantization step size is smaller than a quantization step size which can provide stable encoding.

In such a case, as shown in FIG. 7, as the initial value of the quantization step size is small, an amount of code larger than a target amount generates, and the quantization step size gradually increases. When the quantization step size is too large, the amount of generated code does not reach the target amount, and the quantization step size decreases. After a considerable time, a stable state appears.

Accordingly, when there is a difference between the initial value of the quantization step size and the quantization step size which can provide stable encoding, stable control is not always possible even by performing a simple initialization.

On the other hand, in a video encoding method using interframe encoding, when an abrupt change (e.g., scene change) in the character of the video image occurs, the efficiency of prediction between frames reduces, which may reduce the encoding efficiency. Therefore, in such a case, intraframe prediction is used for encoding instead of interframe prediction.

However, in comparison with interframe prediction encoding, the encoding efficiency of intraframe prediction encoding is lower, and an abrupt increase in the amount of generated code may occur. In particular, if an amount of code based on the interframe prediction encoding has been allocated to a picture which has a change in the character of the video image, an amount of code which greatly exceeds the target amount of code may be generated.

Such an abrupt increase in the amount of generated code may induce an underflow of the decoder buffer.

On the contrary, when there is a scene change from a complex scene to a very simple scene (e.g., a static image), an abrupt decrease in the amount of generated code may induce an overflow of the decoder buffer.

The overflow of the decoder buffer can be prevented by transmitting invalid data such as stuffing data. However, it generates an unwanted amount of code.

In order to solve the above problem, in quantization control, a large amount of feedback for increasing or decreasing the quantization step size for the difference between the target amount of code and the amount of generated code may be set in advance.

When a large amount of feedback is set in advance, the variation in the amount of generated code decreases and a relatively stable condition can be obtained. However, in this case, the variation in the amount of generated code is suppressed regardless of complexity of the relevant video, and thus a variation in image quality increases, which may degrade the subjective image quality.

As described above, if the character of the input video image varies due to a scene change or the like, or the amount of occupation of the decoder buffer is considered, then in the conventional technique, a long time is required until a stable (i.e., converged) state is obtained, or the variation in image quality increases so as to reduce such a time for obtaining a converged state.

In light of the above circumstances, an object of the present invention is to provide a novel quantization control technique for obtaining, when an external cause such as an abrupt change in the character of the input video image or a failure in the decoder buffer occurs, an earlier convergence to a steady state while suppressing an abrupt change in the amount of generated code, thereby preventing the subjective image quality from being degraded through the relevant image sequence.

Means for Solving the Problem

In order to achieve the object, when a quantization control apparatus of the present invention is used in a video encoding which encodes a video image and performs control for making an encoding bit rate approach a predetermined target bit rate, the quantization control apparatus has:

(i) a measurement device that measures a differential amount of code between a target amount of code and an amount of generated code;

(ii) a determination device that determines whether or not a predetermined condition, which causes an abrupt increase or decrease in the amount of generated code, has occurred;

(iii) a feedback amount changing device that determines, when it is determined by the determination device that the condition has occurred, a variation for an amount of feedback which increases or decreases a quantization step size, and changes the amount of feedback based on the determined variation; and (iv) a quantization step size changing device that increases or decreases the quantization step size based on the differential amount of code measured by the measurement device and the amount of feedback changed by the feedback amount changing device.

The above structure may further includes a feedback amount restoring device which makes the amount of feedback to the value before the changing when a predetermined period (defined by a time period or an encoding processing unit) has elapsed after the amount of feedback is changed. If there are a plurality of the predetermined conditions, which cause an abrupt increase or decrease in the amount of generated code, and the amount of feedback is changed in accordance with each condition, the above structure may further includes a feedback amount restoring device which assigns an individual period (defined by a time period or an encoding processing unit) for changing the amount of feedback to each condition, and makes the amount of feedback to the value before the changing when the assigned period has elapsed.

The quantization control method of the present invention implemented by operating the above-described devices can also be implemented by a computer program. Such a computer program may be provided by storing it in an appropriate computer-readable storage medium, or by means of a network, and can be installed and operate on a control device such as a CPU so as to implement the present invention.

In the quantization control apparatus of the present invention having the above-described structure, it is determined whether or not a predetermined condition, which causes an abrupt increase or decrease in the amount of generated code, has occurred.

For example, it is determined that the condition has occurred (i) when an abrupt change in the character of the video image has been detected, (ii) when a possibility of an underflow or an overflow of a buffer on the image receiving side has been detected in accordance with the amount of occupation of the buffer, or (iii) when the amount of generated code is compared with a maximum amount of generated code which is set based on the target amount of code, and an excess of the amount of generated code over the maximum amount of generated code has been detected.

When detecting the occurrence of such a condition, a variation for an amount of feedback which increases or decreases a quantization step size is determined, and the amount of feedback is changed based on the determined variation.

If there are a plurality of the predetermined conditions, a final variation for the amount of feedback may be determined by applying a specific operation to variations for the amount of feedback (e.g., computation of the sum, product, average, or maximum value of the variations), which are determined for the individual conditions.

The amount of feedback may be changed step by step by assigning a plurality of thresholds to the generated condition, and gradually determining the variation for the amount of code when each threshold is exceeded.

When the amount of feedback has been changed as described above, the quantization step size is increased or decreased based on the changed amount of feedback and a measured differential amount of code between the target amount of code and the amount of generated code.

Effect of the Invention

As described above, in the present invention, when encoding a video image, a large amount of feedback for determining the quantization step size for the difference between the target amount of code and the amount of generated code is not set in advance. Instead, the amount of feedback is increased when detecting occurrence of an external cause such as an abrupt change in the character of the input video image or a failure in the decoder buffer. In addition, the amount of feedback is increased not to a specific initial value, but by a displacement from the ordinary amount of feedback.

Therefore, in accordance with the present invention, when an external cause such as an abrupt change in the character of the input video image or a failure in the decoder buffer occurs, an early convergence to a steady state can be obtained while suppressing an abrupt change in the amount of generated code, and as a result, it is possible to prevent the subjective image quality from being degraded through the relevant image sequence.

REFERENCE SYMBOLS

1 video encoding apparatus
10 quantization controller
20 quantization and encoding execution unit
30 scene change detector
100 picture unit processor
101 complex index storage unit
102 complex index updater
103 target code amount computation unit
104 target code amount storage unit
105 maximum code amount computation unit
106 maximum code amount storage unit
107 feedback variation computation unit
108 small block unit processor
1020 average quantization step size computation unit
1021 generated code amount obtaining unit
1022 complex index computation unit
1080 generated code amount measurement unit
1081 virtual buffer state determination unit
1082 generated code amount comparator
1083 feedback variation determination unit
1084 quantization step size determination unit

BEST MODE FOR CARRYING OUT THE INVENTION

Below, the present invention will be explained with reference to embodiments of the present invention.

In the present invention, when encoding a video image, a large amount of feedback for determining the quantization step size for the difference between the target amount of code and the amount of generated code is not set in advance. Instead, the amount of feedback is increased when detecting occurrence of an external cause such as an abrupt change in the character of the input video image or a failure in the decoder buffer. In addition, the amount of feedback is increased not to a specific initial value, but by a displacement from the ordinary amount of feedback, thereby implementing quick convergence to a steady state.

The amount of feedback may be controlled by a reaction parameter r employed in the above-described conventional technique.

The reaction parameter r is used for considering the difference of the amount of generated code from the target amount of code for the quantization step size. The following formula can be obtained by rewriting the above formulas (2) and (3).

[Formula 5]

$$Q_x(j) = Q_x(0) + 31 \cdot \frac{G_x(j-1) - \frac{T_x \cdot (j-1)}{MB_{cnt}}}{r}$$

Formula (5)

As understood by the formula, when the reaction parameter r decreases, the second item of the formula affects the quantization step size to a greater degree. In contrast, when the reaction parameter r increases, the second item of the formula much less affects the quantization step size.

Figure 1:
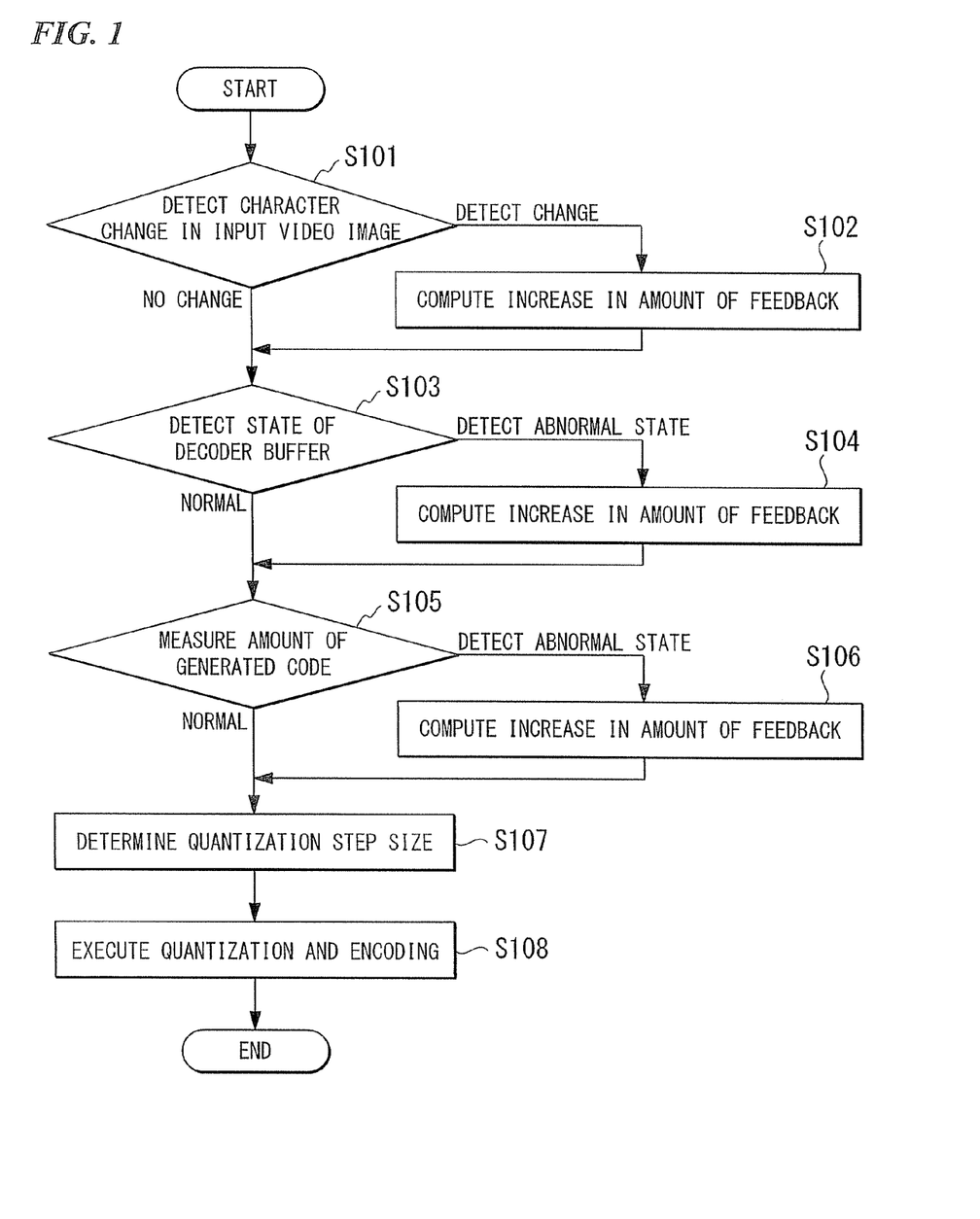
FIG. 1 is a flowchart of an operation in accordance with the present invention.

FIG. 1 is a flowchart showing an example operation in accordance with the present invention.

As shown in the flowchart, in the first step S101, a change (e.g., scene change) in the input video image is detected.

If an abrupt change in the input video image is detected in the above detection, the operation proceeds to step S102, where an increase in the amount of feedback is computed.

In the next step S103, the amount of occupation of the decoder buffer is measured by measuring the amount of occupation of the virtual buffer, so as to detect an underflow in the decoder buffer due to an increase in the amount of generated code or an overflow in the decoder buffer due to a decrease in the amount of generated code.

In accordance with the above detection, if an underflow or overflow in the decoder buffer is detected, the operation proceeds to step S104, where an increase in the amount of feedback is computed.

In the next step S105, the amount of generated code (for the target amount of code) is measured for each small block, so as to determine whether or not the increase in the amount of feedback is sufficient.

If it is determined that the increase in the amount of feedback is insufficient, the operation proceeds to step S106, where an increase in the amount of feedback for making the amount of generated code approach the target amount of code is computed.

In the next step S107, the final amount of feedback is determined in accordance with the determined increase therefor, and based on the final amount, the quantization step size is determined.

In the next step S108, quantization and encoding are executed using the determined quantization step size.

The amount of feedback increased as described above may be returned to the original value after a specific time amount has elapsed.

The amount of feedback can be changed for any unit size such as a GOP, a picture group including a plurality of pictures, one picture, a slice, or a small block.

In addition, whether or not the increase in the amount of feedback is insufficient may be determined based on a ratio of the amount of generated code to the target amount of code. For example, n multiplied by the target amount of code is set as a threshold (i.e., as the maximum amount of generated code), and when the amount of generated code exceeds the maximum amount of generated code, the amount of feedback is increased.

The increase in the amount of generated code may be set as the sum of increases assigned to a plurality of conditions. In such a case, a maximum value may be set so that the amount of feedback is not excessively increased.

Instead of using the sum of increases assigned to a plurality of conditions, the maximum value among the increases assigned to a plurality of conditions may be set as the final increase in the amount of feedback.

An example will be shown, in which $r_a$ indicates the amount of feedback when detecting a scene change; $r_b$ indicates the amount of feedback when detecting a failure in the decoder buffer; and $r_c$ indicates the amount of feedback based on a relationship between the target amount of code and the amount of generated code.

That is, when setting the increase in the amount of feedback as the maximum value among the increases assigned to a plurality of conditions, the final increase in the amount of feedback is determined by the following formula:

$$\Delta r = \max(r_a, r_b, r_c)$$

When setting the increase in the amount of feedback as the sum of the increases assigned to a plurality of conditions, the final increase in the amount of feedback is determined by the following formula:

$$\Delta r = r_a + r_b + r_c$$

When setting the increase in the amount of feedback as the sum of the increases assigned to a plurality of conditions, and also setting the maximum value ($r_{max}$) of the set increase, the final increase in the amount of feedback is determined by the following formula:

$$\Delta r = \min(r_a + r_b + r_c, \max)$$

When setting the increase in the amount of feedback as the product of the increases assigned to a plurality of conditions, the final increase in the amount of feedback is determined by the following formula:

$$\Delta r = r_a \cdot r_b \cdot r_c$$

When setting the increase in the amount of feedback as an average of the increases assigned to a plurality of conditions, the final increase in the amount of feedback is determined by the following formula:

$$\Delta r = (r_a + r_b + r_c)/3$$

In addition, any method can be used for applying an increase to the amount of feedback. For example, the amount of feedback may be multiplied by the increase as a coefficient, or the increase may be added to the amount of feedback.

The method of increasing or decreasing the amount of feedback is determined depending on the method for using quantization control.

In the quantization control using the reaction parameter r, when the reaction parameter r is decreased, the amount of feedback increases, and thus when the reaction parameter r is increased, the amount of feedback decreases.

Additionally, the amount of feedback may be increased step by step. For example, the amount of feedback may be gradually increased at each time when the amount of generated code exceeds 25%, 50%, 75%, and 100% of the maximum amount of generated code.

The period for increasing the amount of feedback is not limited. For example, if it is still insufficient after performing the increasing operation for the picture having a scene change, then encoding may be executed while the increased state of the amount of feedback is kept through a few pictures.

In addition, if there are a plurality of conditions for increasing the amount of feedback and the amount of feedback is changed in accordance with each condition, then an individual period for changing the amount of feedback may be set for each condition, and when the set period has elapsed, the amount of feedback may be returned to the original value before the changing.

The present invention can be applied not only a fixed bit-rate encoding method, but also a variable bit-rate encoding method, where the method should control the amount of generated code by using a target bit rate.

By using such a method in accordance with the present invention, the amount of feedback for quantization control can be controlled in a manner such that the amount of feedback is temporarily increased, thereby reducing the convergence time without increasing the ordinary amount of feedback.

Specific Embodiment

Below, the present invention will be further explained in accordance with a specific embodiment.

Figure 2:
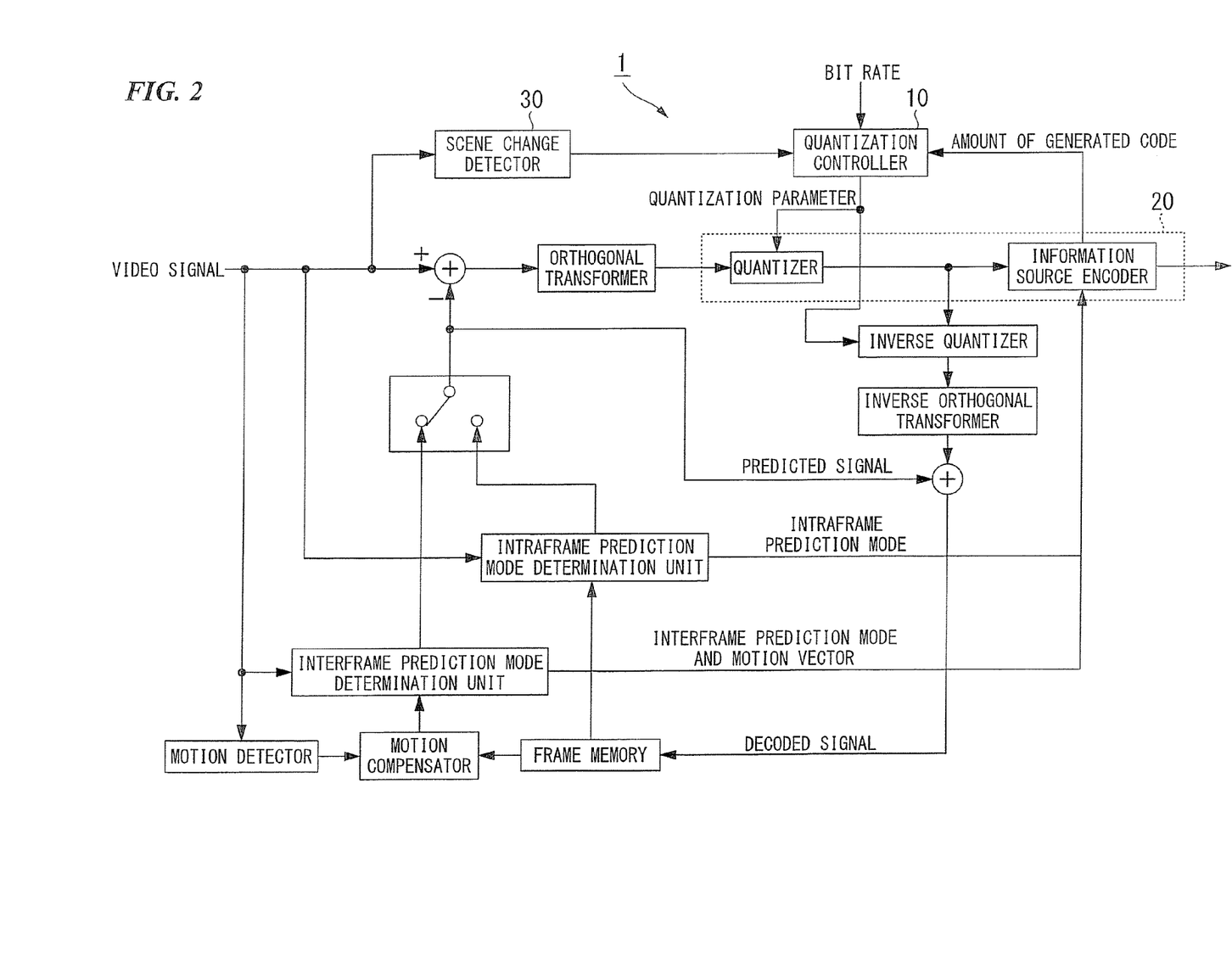
FIG. 2 is a diagram showing an example structure of a video encoding apparatus to which the present invention is applied.

FIG. 2 shows a structure of a video encoding apparatus 1 as an embodiment of the present invention.

As shown in FIG. 2, the video encoding apparatus 1 performs an operation for generating a predicted signal of a video signal, computing a difference between the video signal and the predicted signal, and generating and outputting an encoded bit stream by quantizing and encoding the difference. The video encoding apparatus 1 has a quantization controller 10 for performing quantization control, and a quantization and encoding execution unit 20 which includes a quantizer and an information source encoder. Additionally, in order to implement the present invention, a scene change detector 30 is provided, to which a video signal is input, and which determines whether a scene change has occurred based on the input video signal.

Figure 3:
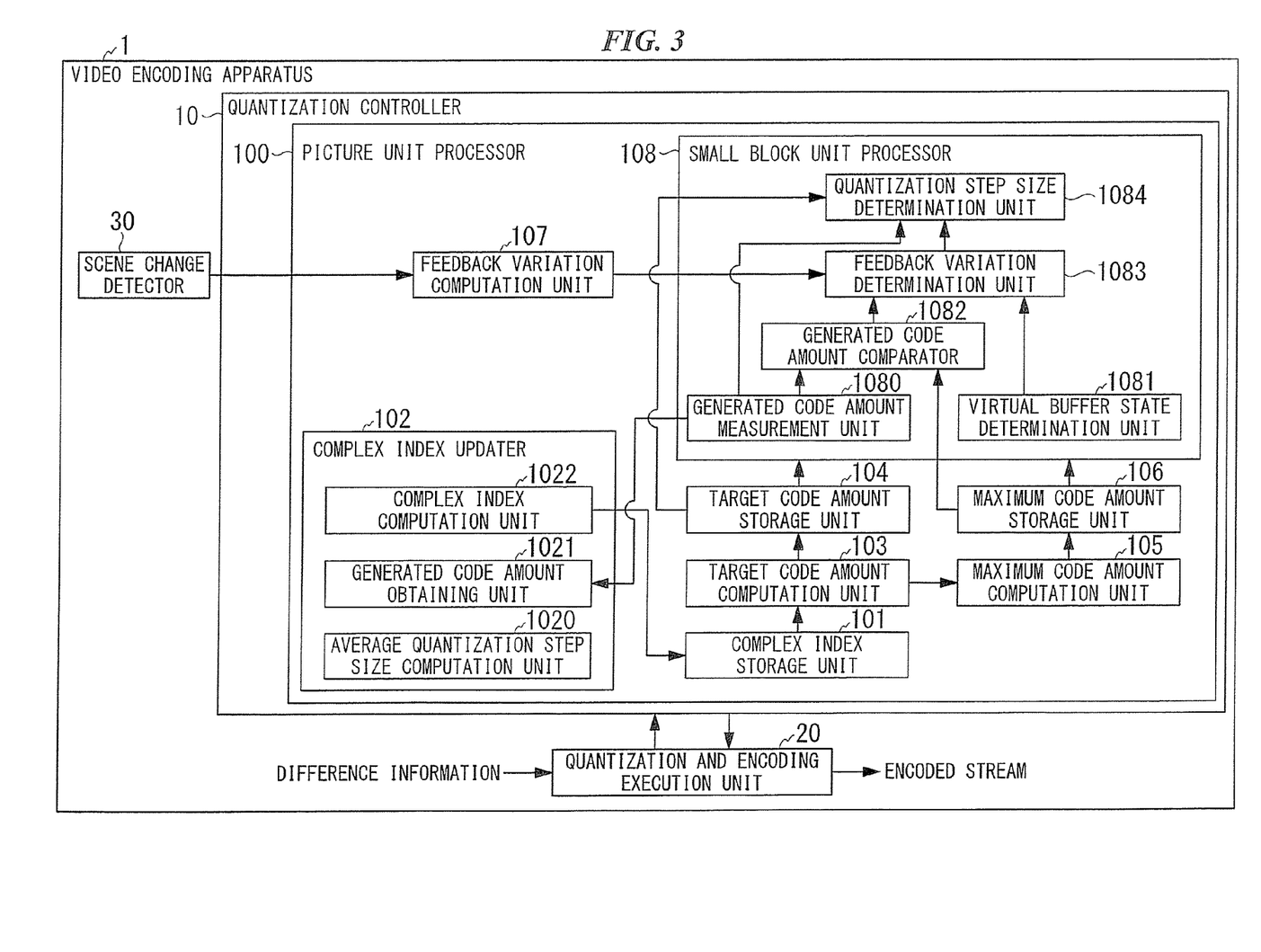
FIG. 3 is a diagram showing an example inner structure of the video encoding apparatus.

FIG. 3 shows an example of the structure of the quantization controller 10 in the video encoding apparatus 1.

As shown in FIG. 3, in order to implement the quantization control of the present invention, the quantization controller 10 has a picture unit processor 100 which includes a complex index storage unit 101, a complex index updater 102, a target code amount computation unit 103, a target code amount storage unit 104, a maximum code amount computation unit 105, a maximum code amount storage unit 106, a feedback variation computation unit 107, and a small block unit processor 108.

The complex index storage unit 101 stores complex index $X_x$ (x=i, p, b) computed for each picture type.

The complex index updater 102 includes an average quantization step size computation unit 1020, a generated code amount obtaining unit 1021, and a complex index computation unit 1022.

The average quantization step size computation unit 1020 computes an average $<Q_x>$ of the quantization step size used for encoding a picture which has the same picture type as the present picture and was encoded most recently.

The generated code amount obtaining unit 1021 obtains the amount of generated code which is required for one picture and measured by a generated code amount measurement unit 1080 (explained later), so as to obtain the amount $S_x$ of generated code for the image which has the same picture type and was encoded most recently.

The complex index computation unit 1022 multiplies the average $<Q_x>$ of the quantization step size, which was computed by the average quantization step size computation unit 1020, by the amount $S_x$ of generated code, which was obtained by the generated code amount obtaining unit 1021, so as to compute the complex index $X_x$ and update the complex index $X_x$ stored in the complex index storage unit 101.

The target code amount computation unit 103 computes the target amount $T_x$ of code (x=i, p, b) for each picture type in accordance with the above-described formulas (1), by using the complex index $X_x$ stored in the complex index storage unit 101.

The target code amount storage unit 104 stores the target amount $T_x$ of code, which is computed by the target code amount computation unit 103.

The maximum code amount computation unit 105 computes the maximum amount $T_{max}$ of code by multiplying n by the target amount $T_x$ of code, which is computed by the target code amount computation unit 103.

The maximum code amount storage unit 106 stores the maximum amount $T_{max}$ of code, which is computed by the maximum code amount computation unit 105.

When the scene change detector 30 has detected generation of a scene change, the feedback variation computation unit 107 computes a variation for the amount of feedback varied in response to the scene change.

The small block unit processor 108 includes:

(i) a generated code amount measurement unit 1080 for measuring the amount of code generated for already-encoded small blocks (i.e., "$G_x(j-1)$" in Formula 3);

(ii) a virtual buffer state determination unit 1081 for determining whether or not a state which may cause an underflow or an overflow in the decoder buffer has appeared, by measuring the amount of occupation of the virtual buffer (i.e., "$d_x(j)$" in Formula 3);

(iii) a generated code amount comparator 1082 for comparing the amount of generated code, which is measured by the generated code amount measurement unit 1080, with the maximum amount $T_{max}$ of code, which is stored in the maximum code amount storage unit 106, so as to determine whether or not a state in which the amount of generated code exceeds the maximum amount $T_{max}$ has appeared;

(iv) a feedback variation determination unit 1083 for determining the variation in the amount of feedback and a period for varying the amount of feedback, based on the variation for the amount of feedback, which was computed by the feedback variation computation unit 107, the result of determination performed by the virtual buffer state determination unit 1081, and the result of comparison performed by the generated code amount comparator 1082; and (v) a quantization step size determination unit 1084 for increasing or decreasing the quantization step size based on the target amount $T_x$ of code stored in the target code amount storage unit 104, the amount of generated code, which was measured by the generated code amount measurement unit 1080, and the variation for the amount of feedback, which was determined by the feedback variation determination unit 1083.

In the present embodiment, a known quantization control algorithm is used, and the amount of feedback is increased or decreased by increasing or decreasing the reaction parameter r. The following conditions cause an increase in the amount of feedback.

That is, the increase is caused:
(i) when a scene change has been detected;
(ii) when a failure in the decoder buffer has been detected; or
(iii) when the measured amount of generated code has exceeded the maximum amount of generated code.

In addition, the amount of feedback for each condition is accumulated.

The amount of feedback is increased during the processing of the encoding target picture.

The maximum amount of generated code is twice the target amount of code.

The increase $\Delta r$ is reflected on the amount of feedback by subtracting $\Delta r$ from the original reaction parameter r, where the maximum increase is set as half the relevant reaction parameter.

Figure 4:
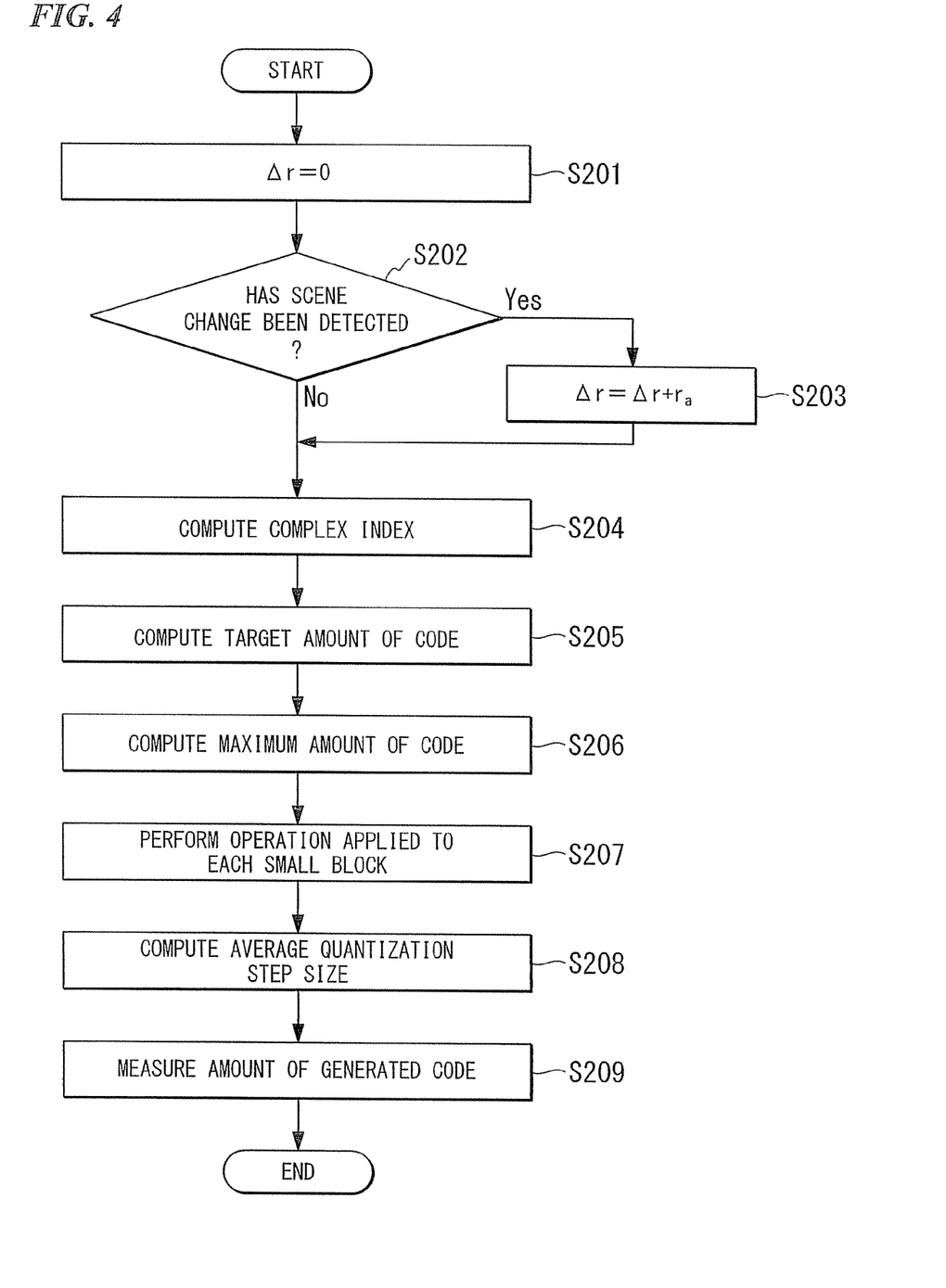
FIG. 4 is an example flowchart executed by the video encoding apparatus.
Figure 5:
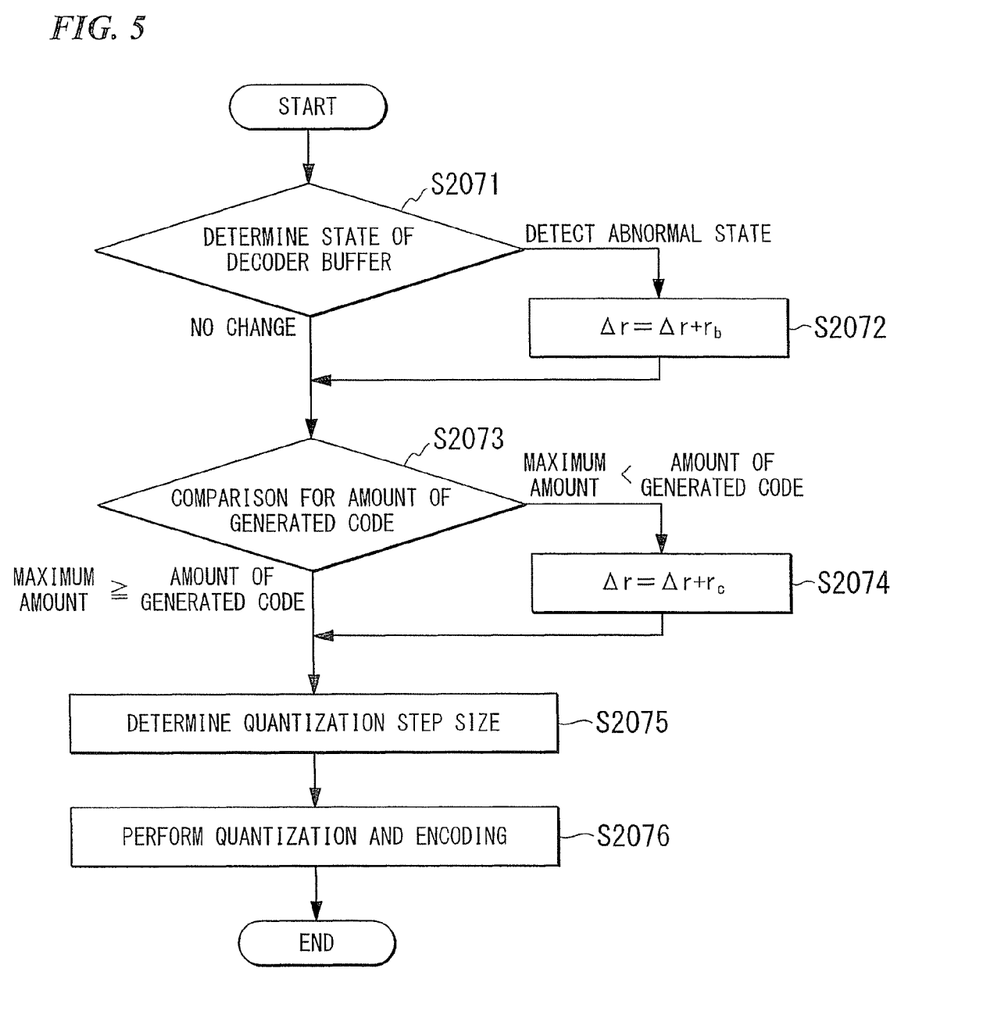
FIG. 5 is also an example flowchart executed by the video encoding apparatus.

FIGS. 4 and 5 show an example of the flowchart executed by the video encoding apparatus 1 having the structure of FIG. 3.

FIG. 4 is a flowchart for each picture, and FIG. 5 is a flowchart for each small block.

Referring to the above flowcharts, the quantization control operation performed by the video encoding apparatus 1 will be explained in detail.

In the video encoding apparatus 1, the increase $\Delta r$ for the amount of feedback is initialized as shown in FIG. 4 (see in the first step S201).

In the next step S202, scene change detection is performed. When a scene change has been detected, the operation proceeds to step S203, where $r_a$ is added to the increase $\Delta r$ for the amount of feedback, so as to update $\Delta r$ as follows:

$$\Delta r = \Delta r + r_a$$

In the next step S204, based on (i) the average $\langle Q_x \rangle$ of the quantization step size used for encoding a picture which has the same picture type as the present picture and was encoded most recently and (ii) the amount $S_x$ of code generated in the relevant encoding, the complex index $X_x$ is computed by the following formula:

$$X_x = S_x \cdot \langle Q_x \rangle$$

In the next step S205, the target amount $T_x$ of code is computed based on the above-described formulas (1) for each picture type, by using the computed complex index $X_x$.

In the next step S206, the maximum amount $T_{max}$ of code is computed by multiplying n by the computed target amount $T_x$ of code.

In the next step S207, the operation applied to each small block is performed in accordance with the flowchart of FIG. 5.

That is, when the operation for each small block starts (see the flowchart of FIG. 5), in the first step S2071, the amount $d_x(j)$ of occupation of the decoder buffer (derived using the above-described formula (3)) is measured so as to determine the state of the decoder buffer (i.e., buffer on the data receiving side).

When a state which may cause an underflow or overflow in the decoder buffer has been detected, the operation proceeds to step S2072, where $r_b$ is added to the increase $\Delta r$ for the amount of feedback, so as to update $\Delta r$ as follows:

$$\Delta r = \Delta r + r_b$$

In the next step S2073, the amount $G_x(j-1)$ of code generated for the first to (j−1)th small blocks is compared with the maximum amount $T_{max}$ of code i. If $G_x(j-1)$ is larger than $T_{max}$, the operation proceeds to step S2074, where $r_c$ is added to the increase $\Delta r$ for the amount of feedback, so as to update $\Delta r$ as follows:

$$\Delta r = \Delta r + r_c$$

The size of $\Delta r$ is then confirmed, and clipping thereof is performed if necessary, as follows:

$$\Delta r = \Delta r$$
$$= r/2$$
$$\Delta r < r/2$$
$$\Delta r \geq r/2$$

In the next step S2075, r is decreased by $\Delta r$ in accordance with the following formula, so as to increase the amount of feedback and determine the quantization step size $Q_x(j)$ of the j-th small block.

[Formula 6]

$$Q_x(j) = Q_x(0) + 31 \cdot \frac{G_x(j-1) - \frac{T_x \cdot (j-1)}{MB_{cnt}}}{r - \Delta r} \qquad \text{Formula (6)}$$

In the above formula, $MB_{cnt}$ indicates the number of small blocks in the relevant picture, $T_x$ indicates the target amount of code for the relevant picture, and $G_x(j-1)$ indicates the amount of code generated for the first to (j−1)th small blocks.

In the next step S2076, quantization and encoding of the j-th small block are performed using the determined quantization step size $Q_x(j)$.

When encoding of one picture has been completed in accordance with the flowchart of FIG. 5, the operation proceeds to step S208 in FIG. 4, where the average quantization step size $\langle Q_x \rangle$ is computed. In the next step S209, the actual amount $S_x$ of generated code (obtained by the final $G_x(j)$) is measured.

In the above-described step S204, the complex index $X_x$ for each picture type is updated based on the measured amount $S_x$ of generated code and the computed average quantization step size $\langle Q_x \rangle$.

As described above, in the present invention, a change in the character of the video image is detected or the amount of occupation of a buffer is measured so as to temporarily increase the amount of feedback, thereby reducing the convergence time without increasing the ordinary amount of feedback.

Although the present invention has been explained in accordance with the illustrated embodiment, the present invention is not limited thereto.

For example, although the above embodiment is based on quantization control defined in TM5 of MPEG-2, the present invention can be directly applied to any encoding method which performs feedback control for making the encoding bit rate approach a target bit rate.

In such a case, the device for increasing the amount of feedback may be modified in accordance with the employed algorithm.

Industrial Applicability

In accordance with the present invention, when an external cause such as an abrupt change in the character of the input video image or a failure in the decoder buffer occurs, an early convergence to a steady state can be obtained while suppressing an abrupt change in the amount of generated code, and as a result, it is possible to prevent the subjective image quality from being degraded through the relevant image sequence.

The invention claimed is:

1. A quantization control method used in a video encoding which encodes a video image and performs bit-rate control for making an encoding bit rate approach a predetermined target bit rate, wherein the quantization control method comprises the steps of:
    measuring a differential amount of code between a target amount of code and an amount of generated code;
    determining whether or not a predetermined condition, which causes an abrupt change in the amount of generated code and potential failure in the bit-rate control, has occurred;
    determining, when it is determined that the condition has occurred, a variation that is a displacement from a current amount of feedback which is set for the differential amount of code and increases or decreases a quantization step size; temporarily changing the amount of feedback for a period of time by which a quick convergence to a steady state is obtained, based on the determined variation while securing the original amount of feedback before the changing; and
    increasing or decreasing the quantization step size based on the measured differential amount of code and the changed amount of feedback, wherein the quantization step size is computed by:

$$Qx(j)=Qx(0)+A\cdot(Gx-Tx)/(r-\Delta r)$$

where $Qx(j)$ denotes the quantization step size of the j-th block among blocks to be sequentially processed in the video image; $Qx(0)$ denotes a base quantization step size; $A$ denotes a maximum quantization step size; $(Gx-Tx)$ denotes the measured differential amount of code between the target amount $Gx$ of code and the amount $Tx$ of generated code; $r$ denotes the original amount of feedback before the changing, and $\Delta r$ denotes the changed amount of feedback.

2. The quantization control method in accordance with claim 1, wherein:
    if there are a plurality of the predetermined conditions, the changing of the amount of feedback includes determining a final variation for the amount of feedback by applying a specific operation to variations for the amount of feedback, which are determined for the individual conditions.

3. The quantization control method in accordance with claim 2, wherein:
    said plurality of the predetermined conditions respectively occur by a plurality of external causes other than quantization control.

4. The quantization control method in accordance with claim 1, wherein:
    the changing of the amount of feedback includes changing the amount of feedback step by step by assigning a plurality of thresholds to the condition, and gradually determining the variation for the amount of code when each threshold is exceeded.

5. The quantization control method in accordance with claim 1, wherein:
    if there are a plurality of the predetermined conditions and the amount of feedback is changed in accordance with each condition, then an individual period for changing the amount of feedback is assigned to each condition, and when the assigned period has elapsed, the amount of feedback is returned to the value before the changing.

6. The quantization control method in accordance with claim 1, wherein:
    in the step of determining whether or not a predetermined condition has occurred, when an abrupt change in the character of the video image has been detected, it is determined that the condition has occurred.

7. The quantization control method in accordance with claim 1, wherein:
    in the step of determining whether or not a predetermined condition has occurred, when a possibility of an underflow or an overflow of a buffer on the image receiving side has been detected in accordance with the amount of occupation of the buffer, it is determined that the condition has occurred.

8. The quantization control method in accordance with claim 1, wherein:
    in the step of determining whether or not a predetermined condition has occurred, it is determined that the condition has occurred when the amount of generated code is compared with a maximum amount of generated code which is set based on the target amount of code, and an excess of the amount of generated code over the maximum amount of generated code has been detected.

9. A non-transitory computer-readable storage medium which stores a quantization control program by which a computer executes an operation for implementing the quantization control method in accordance with claim 1.

10. The quantization control method in accordance with claim 1, wherein:
    the video encoding uses a fixed bit-rate encoding method.

11. The quantization control method in accordance with claim 1, wherein:
    the predetermined condition occurs by an external cause other than quantization control.

12. A quantization control apparatus used in a video encoding which encodes a video image and performs bit-rate control for making an encoding bit rate approach a predetermined target bit rate, wherein the quantization control apparatus comprises:
    a device that measures a differential amount of code between a target amount of code and an amount of generated code;
    a device that determines whether or not a predetermined condition, which causes an abrupt change in the amount of generated code and potential failure in the bit-rate control, has occurred;
    a device that:
    determines, when it is determined that the condition has occurred, a variation that is a displacement from a current amount of feedback which is set for the differential amount of code and increases or decreases a quantization step size; and
    temporarily changes the amount of feedback for a period of time by which a quick convergence to a steady state is obtained, based on the determined variation while securing the original amount of feedback before the changing; and
    a device that increases or decreases the quantization step size based on the measured differential amount of code and the changed amount of feedback, wherein the quantization step size is computed by:

$$Qx(j)=Qx(0)+A\cdot(Gx-Tx)/(r-\Delta r)$$

where Qx(j) denotes the quantization step size of the j-th block among blocks to be sequentially processed in the video image; Qx(0) denotes a base quantization step size;

A denotes a maximum quantization step size; (Gx−Tx) denotes the measured differential amount of code between the target amount Gx of code and the amount Tx of generated code; r denotes the original amount of feedback before the changing, and Δr denotes the changed amount of feedback.

13. The quantization control apparatus in accordance with claim 12, wherein:

the video encoding uses a fixed bit-rate encoding method.

14. The quantization control apparatus in accordance with claim 12, wherein:

if there are a plurality of the predetermined conditions, the changing of the amount of feedback includes determining a final variation for the amount of feedback by applying a specific operation to variations for the amount of feedback, which are determined for the individual conditions.

15. The quantization control apparatus in accordance with claim 14, wherein:

said plurality of the predetermined conditions respectively occur by a plurality of external causes other than quantization control.

16. The quantization control apparatus in accordance with claim 12, wherein:

the predetermined condition occurs by an external cause other than quantization control.

* * * * *